United States Patent
Jokela et al.

(10) Patent No.: US 11,412,424 B2
(45) Date of Patent: Aug. 9, 2022

(54) CONDITIONAL HANDOVER

(71) Applicant: NOKIA TECHNOLOGIES OY, Espoo (FI)

(72) Inventors: Tommi Jokela, Espoo (FI); Mikko Säily, Laukkoski (FI); Ingo Viering, Munich (DE); Timo Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/733,496

(22) PCT Filed: Feb. 14, 2018

(86) PCT No.: PCT/FI2018/050103
§ 371 (c)(1),
(2) Date: Aug. 11, 2020

(87) PCT Pub. No.: WO2019/158801
PCT Pub. Date: Aug. 22, 2019

(65) Prior Publication Data
US 2021/0076271 A1  Mar. 11, 2021

(51) Int. Cl.
*H04W 36/00* (2009.01)

(52) U.S. Cl.
CPC . *H04W 36/0072* (2013.01); *H04W 36/00835* (2018.08)

(58) Field of Classification Search
CPC ......... H04W 36/0072; H04W 36/0079; H04W 36/00835
See application file for complete search history.

(56) References Cited

U.S. PATENT DOCUMENTS

| 2014/0126545 A1* | 5/2014 | Tamura | H04W 36/0079 370/332 |
| 2016/0119862 A1 | 4/2016 | Rinne et al. | |
| 2020/0029251 A1* | 1/2020 | Wu | H04W 36/0016 |

FOREIGN PATENT DOCUMENTS

| CN | 107113673 A | 8/2017 |
| WO | 2016130062 A1 | 8/2016 |

OTHER PUBLICATIONS

3rd Generation Partnership Project (3GPP) Draft 3GPP R2 1703384, "Analysis on conditional handover"; Agenda Item: Item 10.2.4.4; Apr. 3, 2017; (Huawei et al). (Year: 2017).*

(Continued)

*Primary Examiner* — Myron Wyche
(74) *Attorney, Agent, or Firm* — Brake Hughes Bellermann LLP

(57) ABSTRACT

An apparatus suitable for at least to: receive, from a serving access node, a random access update precondition and a configuration with regard to a conditional handover, wherein the configuration indicates at least one handover candidate cell; carry out measurements according to the configuration, and if the random access update precondition is fulfilled, transmit a message to the serving access node, the message comprising information obtained by the measurements and indicating at least one beam of at least one handover candidate cell and/or at least one handover candidate cell that caused the random access update precondition being fulfilled for obtaining a random access resource configuration for carrying out the conditional handover.

18 Claims, 4 Drawing Sheets

(56) References Cited

OTHER PUBLICATIONS

Figure 1:
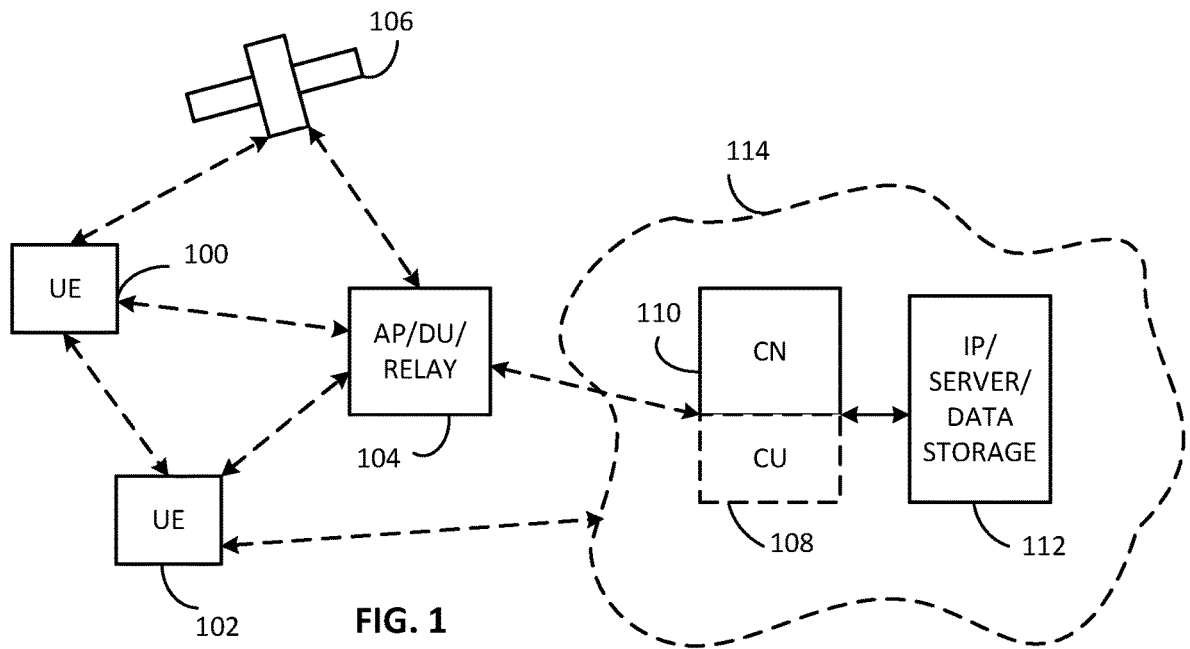

International Search Report and Written Opinion for International Application No. PCT/FI2018/050103, dated May 7, 2018, 16 pages.
3GPP TSG-RAN WG2 #97BIS, R2-1703384; "Analysis on Conditional Handover"; Spokane, Washington, USA; Apr. 3-7, 2017; 7 pages.
3GPP TSG-RAN WG2 Meeting #101, R2-1802008 (Resubmission of R2-1800663); "Discussion on Conditional Handover in NR"; Athens, Greece; Feb. 26-Mar. 2, 2018; 6 pages.
European Search Report for Application No. 18905954.6, dated Sep. 23, 2021, 16 pages.
3GPP TSG-RAN WG2 #100, R2-1713606; "Conditional Handover"; Agenda Item: 10.2.11; Souce: Ericsson; Reno, Nevada; Nov. 27-Dec. 1, 2017, 5 pages.
First Examination Report for Indian Application No. 202047038271, dated Nov. 29, 2021, 7 pages.
Office Action for Chinese Application No. 201880089310.1, dated Jan. 4, 2022, 10 pages.

* cited by examiner

CONDITIONAL HANDOVER

CROSS-REFERENCE TO RELATED APPLICATIONS

This application is a national stage entry of International Application No. PCT/FI2018/050103, filed Feb. 14, 2018, entitled "CONDITIONAL HANDOVER" which is hereby incorporated by reference in its entirety.

FIELD

The invention relates to communications.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

In conditional handover (CHO), a handover target cell is prepared in advance based on a measurement report (MR) from a user device. The user device will access the candidate cell based on a trigger that is configured by a radio access network, hence avoiding radio link failures due to failed handover command. In New Radio (NR) or 5G, communication between the user device and the radio access network may occur via narrow beams. Both cell and beam level measurements can be exploited in the handover procedure.

BRIEF DESCRIPTION

According to an aspect, there is provided an apparatus comprising: at least one processor and at least one memory including a computer program code, the at least one memory and the computer program code configured to, with the at least one processor, cause the apparatus at least to: receive, from a serving access node, a random access update precondition and a configuration with regard to a conditional handover, wherein the configuration indicates at least one handover candidate cell; carry out measurements according to the configuration, and if the random access update precondition is fulfilled, transmit a message to the serving access node, the message comprising information obtained by the measurements and indicating at least one beam of at least one handover candidate cell and/or at least one handover candidate cell that caused the random access update precondition being fulfilled for obtaining a random access resource configuration for carrying out the conditional handover.

According to an aspect, there is provided an apparatus comprising: at least one processor and at least one memory including a computer program code, the at least one memory and the computer program code configured to, with the at least one processor, cause the apparatus at least to: prepare a configuration and a random access update precondition for a user device with regard to a conditional handover, wherein the configuration indicates at least one handover candidate cell; transmit the configuration and the random access update precondition to the user device; receive a message from the user device, the message comprising information obtained by measurements carried out by the user device based on the configuration and indicating at least one beam of the at least one handover candidate cell and/or at least one handover candidate cell that caused the random access update precondition being fulfilled; transmit a message to the at least one handover candidate cell that caused the random access update precondition being fulfilled for that cell being a handover target cell and reserving random access resources for the user device, wherein the message comprises the information obtained by the measurements carried out by the user device and, if indicated by the user device, indicating the at least one beam; receive a message from the least one handover candidate cell being the handover target cell, the message indicating the reserved random access resources, and carry out a resource configuration based on the reserved random access resources and transmit information on the resource configuration, or forward the indication of the reserved random access resources to the user device for carrying out the conditional handover.

According to an aspect, there is provided a method comprising: receiving, from a serving access node, a random access update precondition and a configuration with regard to a conditional handover, wherein the configuration indicates at least one handover candidate cell; carrying out measurements according to the configuration, and if the random access update precondition is fulfilled, transmitting a message to the serving access node, the message comprising information obtained by the measurements and indicating at least one beam of at least one handover candidate cell and/or at least one handover candidate cell that caused the random access update precondition being fulfilled for obtaining a random access resource configuration for carrying out the conditional handover.

According to an aspect, there is provided a method comprising: preparing a configuration and a random access update precondition for a user device with regard to a conditional handover, wherein the configuration indicates at least one handover candidate cell; transmitting the configuration and the random access update precondition to the user device; receiving a message from the user device, the message comprising information obtained by measurements carried out by the user device based on the configuration and indicating at least one beam of the at least one handover candidate cell and/or at least one handover candidate cell that caused the random access update precondition being fulfilled; transmitting a message to the at least one handover candidate cell that caused the random access update precondition being fulfilled for that cell being a handover target cell and reserving random access resources for the user device, wherein the message comprises the information obtained by the measurements carried out by the user device and, if indicated by the user device, indicating the at least one beam; receiving a message from the least one handover candidate cell being the handover target cell, the message indicating the reserved random access resources, and carrying out a resource configuration based on the reserved random access resources and transmit information on the resource configuration, or forwarding the indication of the reserved random access resources to the user device for carrying out the conditional handover.

According to an aspect, there is provided a computer program product for a computer, comprising software code portions for performing: receiving, from a serving access node, a random access update precondition and a configuration with regard to a conditional handover, wherein the configuration indicates at least one handover candidate cell; carrying out measurements according to the configuration, and if the random access update precondition is fulfilled, transmitting a message to the serving access node, the message comprising information obtained by the measurements and indicating at least one beam of at least one handover candidate cell and/or at least one handover candidate cell that caused the random access update precondition being fulfilled for obtaining a random access resource configuration for carrying out the conditional handover.

According to an aspect, there is provided a computer program product for a computer, comprising software code portions for performing: preparing a configuration and a random access update precondition for a user device with regard to a conditional handover, wherein the configuration indicates at least one handover candidate cell; transmitting the configuration and the random access update precondition to the user device; receiving a message from the user device, the message comprising information obtained by measurements carried out by the user device based on the configuration and indicating at least one beam of the at least one handover candidate cell and/or at least one handover candidate cell that caused the random access update precondition being fulfilled; transmitting a message to the at least one handover candidate cell that caused the random access update precondition being fulfilled for that cell being a handover target cell and reserving random access resources for the user device, wherein the message comprises the information obtained by the measurements carried out by the user device and, if indicated by the user device, indicating the at least one beam; receiving a message from the least one handover candidate cell being the handover target cell, the message indicating the reserved random access resources, and carrying out a resource configuration based on the reserved random access resources and transmit information on the resource configuration, or forwarding the indication of the reserved random access resources to the user device for carrying out the conditional handover.

According to an aspect, there is provided an apparatus comprising: means for receiving, from a serving access node, a random access update precondition and a configuration with regard to a conditional handover, wherein the configuration indicates at least one handover candidate cell; means for carrying out measurements according to the configuration, and means for transmitting a message to the serving access node, the message comprising information obtained by the measurements and indicating at least one beam of at least one handover candidate cell and/or at least one handover candidate cell that caused the random access update precondition being fulfilled for obtaining a random access resource configuration for carrying out the conditional handover, if the random access update precondition is fulfilled.

According to an aspect, there is provided an apparatus comprising: means for preparing a configuration and a random access update precondition for a user device with regard to a conditional handover, wherein the configuration indicates at least one handover candidate cell; means for transmitting the configuration and the random access update precondition to the user device; means for receiving a message from the user device, the message comprising information obtained by measurements carried out by the user device based on the configuration and indicating at least one beam of the at least one handover candidate cell and/or at least one handover candidate cell that caused the random access update precondition being fulfilled; means for transmitting a message to the at least one handover candidate cell that caused the random access update precondition being fulfilled for that cell being a handover target cell and reserving random access resources for the user device, wherein the message comprises the information obtained by the measurements carried out by the user device and, if indicated by the user device, indicating the at least one beam; means for receiving a message from the least one handover candidate cell being the handover target cell, the message indicating the reserved random access resources, and means for carrying out a resource configuration based on the reserved random access resources and transmit information on the resource configuration, or forwarding the indication of the reserved random access resources to the user device for carrying out the conditional handover.

According to an aspect, there is provided a distributed system comprising: means for preparing a configuration and a random access update precondition for a user device with regard to a conditional handover, wherein the configuration indicates at least one handover candidate cell; means for transmitting the configuration and the random access update precondition to the user device; means for receiving a message from the user device, the message comprising information obtained by measurements carried out by the user device based on the configuration and indicating at least one beam of the at least one handover candidate cell and/or at least one handover candidate cell that caused the random access update precondition being fulfilled; means for transmitting a message to the at least one handover candidate cell that caused the random access update precondition being fulfilled for that cell being a handover target cell and reserving random access resources for the user device, wherein the message comprises the information obtained by the measurements carried out by the user device and, if indicated by the user device, indicating the at least one beam; means for receiving a message from the least one handover candidate cell being the handover target cell, the message indicating the reserved random access resources, and means for carrying out a resource configuration based on the reserved random access resources and transmit information on the resource configuration, or forwarding the indication of the reserved random access resources to the user device for carrying out the conditional handover.

LIST OF DRAWINGS

Figure 5:
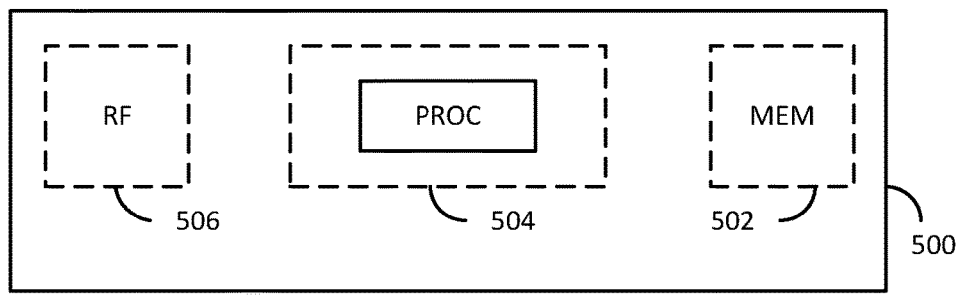
Figure 6:
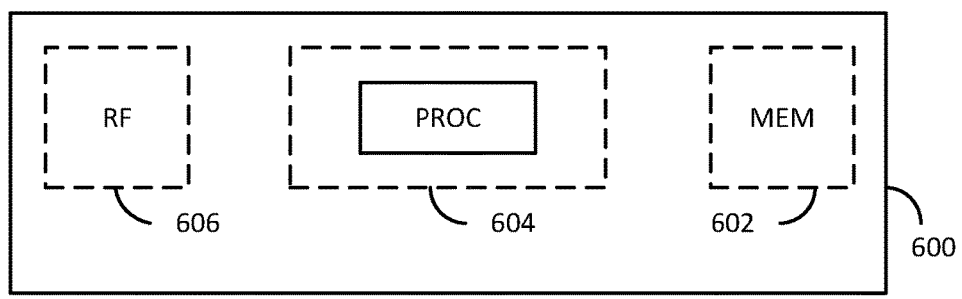
Figure 2:
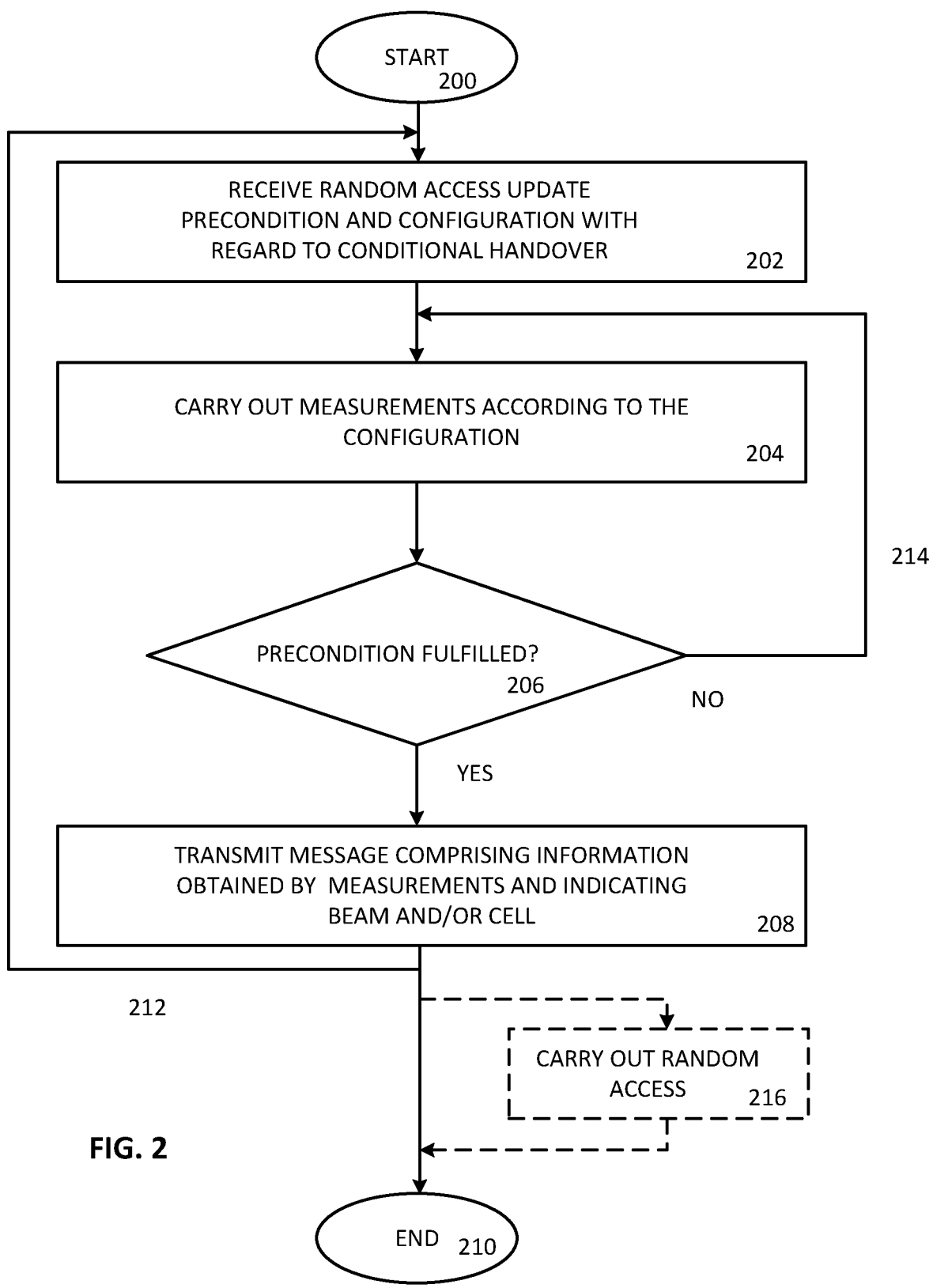
Figure 3:
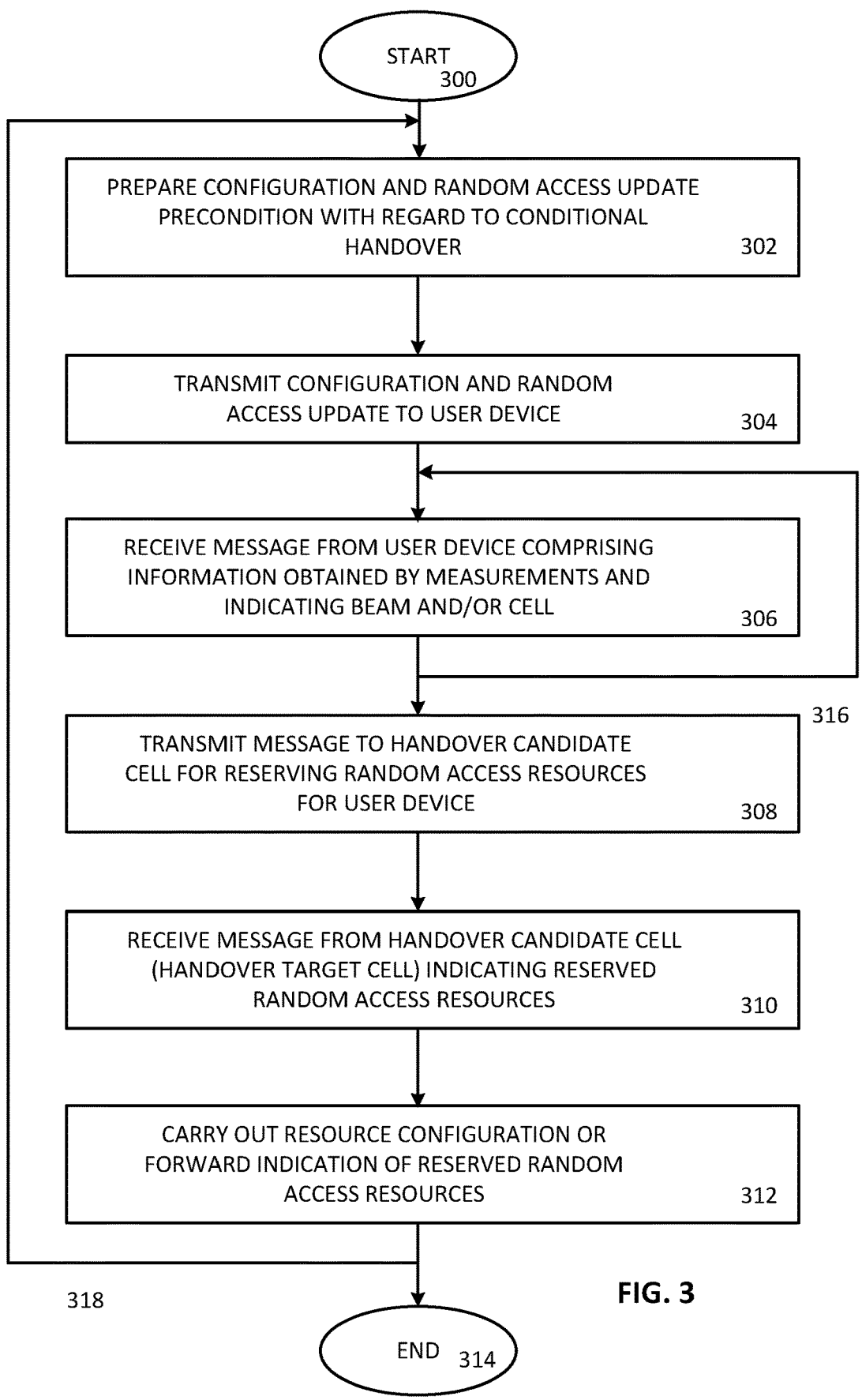
Figure 4:
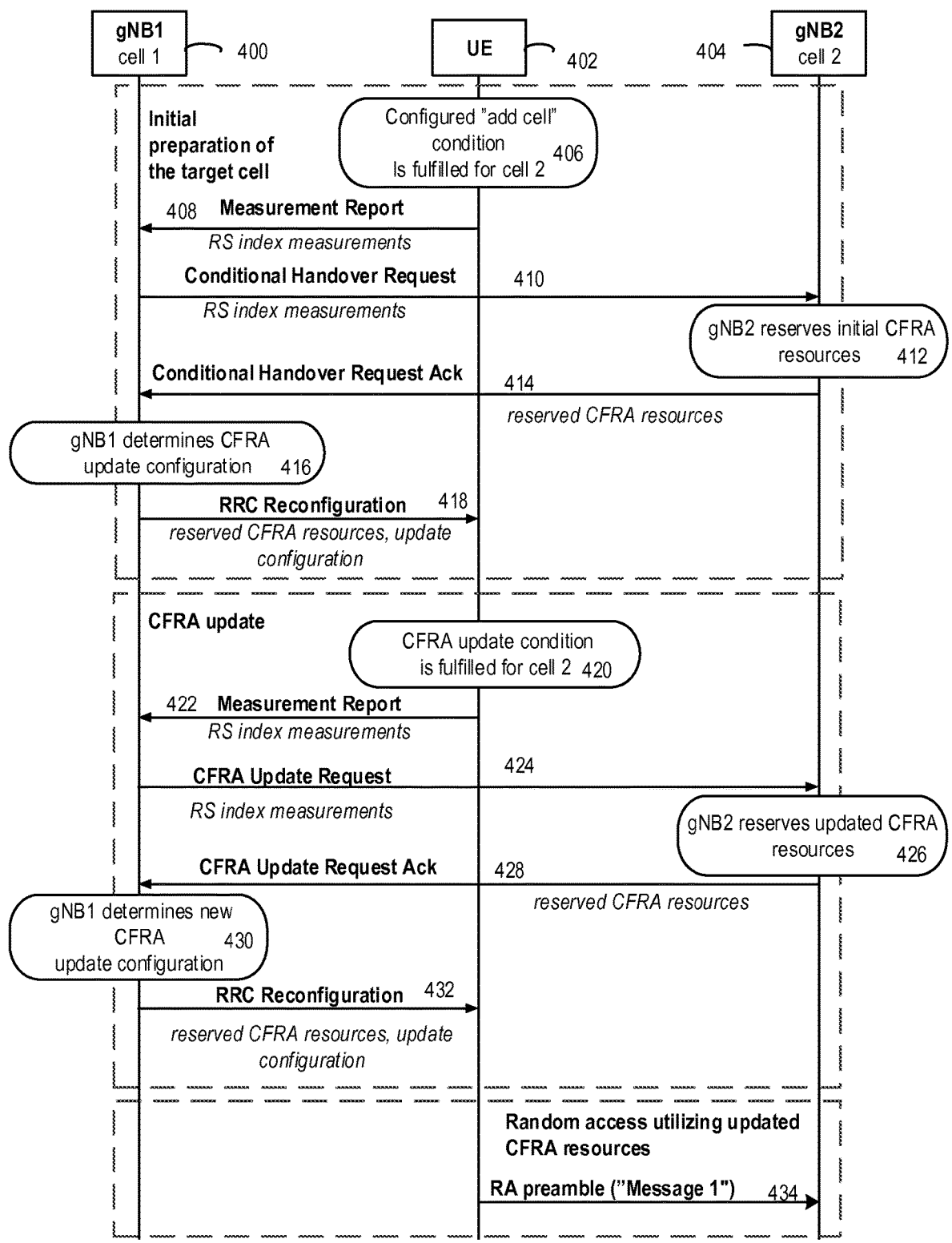

Some embodiments of the present invention are described below, by way of example only, with reference to the accompanying drawings, in which FIG. 1 illustrates an example of a system;
FIG. 2 is a flow chart;
FIG. 3 is another flow chart;
FIG. 4 depicts an example of a signaling chart;
FIG. 5 illustrates an example of apparatuses, and
FIG. 6 illustrates another example of apparatuses.

DESCRIPTION OF SOME EMBODIMENTS

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

In the following, embodiments suitable for a conditional handover are disclosed in further detail. In a conditional handover, a significant delay exists between the time when a user device carries out reference signal (RS) index specific measurements and the time when it transmits a random access preamble on resources that were reserved based on these measurements.

Some embodiments provide an option to enable a more efficient resource reservation for a random access (CFRA, contention free random access).

To assist a radio access network in the handover preparation, a user device may be configured to report reference signal index specific measurements of the strongest neighbor cell(s) as a part of the measurement report. The serving gNB may signal these measurements to target cell(s), which utilize them to reserve contention free random access (CFRA) resources for the user device to be used when it accesses the target cell.

Because of the delay between the measurements and accessing the cell, quality provided by the configured random access resources may drop below a level where a successful contention free random access is not possible. In such cases, the user device shall resort to a contention based random access (CBRA) procedure, which potentially increases the random access delay (due to collisions, since user devices can randomly select resources to be used in accessing a cell), and consequently the handover interruption time.

It should be appreciated that the coding of software for carrying out the embodiments shown and described below is well within the scope of a person of ordinary skill in the art.

One embodiment starts in block 200 of FIG. 2. This embodiment is suitable for being carried out by user device performing a conditional handover. Terms "receive" and "transmit" may comprise reception or transmission via a radio path. These terms may also mean preparation of a message to the radio path for an actual transmission or processing a message received from the radio path, for example, or controlling or causing a transmission or reception, when embodiments are implemented by software.

In block 202, receiving, from a serving access node, a random access update precondition and a configuration with regard to a conditional handover, wherein the configuration indicates at least one handover candidate cell.

It should be understood that the user device may have carried out measurements and transmitted a measurement report to the serving access node for the serving access node being able to carry out an initial preparation of a target cell with regard to a conditional handover (define at least one candidate cell). This initial procedure may be carried out, for instance, by a user device detecting that a configured "add cell" condition is satisfied, based on conducted serving and neighbor cell measurements. The user device sending a measurement report to a serving access node, wherein the message comprises at least RS index specific measurements for the strongest SSB or CSI-RS beams of the candidate cell, and possibly also a combination of RS index and cell specific measurements for the serving cell and the strongest neighbor cells according to the configuration. The serving access node sending a conditional handover request message to a candidate handover target cell, wherein the message comprises the RS index measurements for the candidate handover target cell.

The handover candidate cell selection for the configuration may also be, optionally or additionally, based on geography, cell size, user device's mobility, cell load, etc. as in a normal handover procedure.

The serving access node determines a random access update precondition (for example based on the initial procedure described above), it may also determine a separate reporting configuration, for example a period for reporting which may be proportional to the mobility of the user device and/or cell size. The update precondition may be given per a handover candidate cell or it may be a group-specific, for instance, applicable for cells in a certain geographical area. In case the update configuration is not present (or indicated by a single bit whether to update) the user device may assume that a previously stored default configuration is applicable. As another option for the reporting configuration is for defining the set of the cells the user device should include in a measurement report, for example: report measurements for a defined number of strongest candidate cells and/or beams or report measurements only for the strongest cell and/or beam (when no one of the handover candidate cells fulfil the random access update precondition). It is also possible to define that no reporting should be carried out for a certain period of time.

Measurements on the handover candidate cell(s) may be derived based on synchronization signal blocks (SSB) and/or channel state information reference signal (CSI-RS). An SSB (or synchronization sequences (SS) and physical broadcast channel (PBCH) block), may comprise a primary synchronization signal (PSS), secondary synchronization signal (SSS) and/or, PBCH (including PBCH demodulation reference signal (DMRS)). Both cell and reference signal (RS) index ("beam") specific radio resource management (RRM) measurements, such as reference signal received power (RSRP), reference signal received quality (RSRQ) and signal-to-interference-plus-noise ratio (SINR)) may be derived based on these signals.

The random access update precondition may comprise a threshold value to be used in evaluating whether the random access update precondition is fulfilled. The threshold value may be set based on the earlier measured values for the best cell or for a certain number of the best cells or based on the required rata rate or quality of service (for example, required reliability of the service), etc.

In one example, the random access update precondition may comprise determining, when the average of a certain number of resources measured to have the best quality falls below the threshold. In another example, if only a certain number of resources (beams) exceeds the threshold, an update is triggered. In another option, a user device may have been configured with a number of resources and when only some of them are considered to be above the threshold, an update is triggered. An update may be triggered as well, when no resources are above the threshold. Alternatively, network may configure the user device to report periodically a certain number of resources measured as the best ones. Optionally, the user device may be configured to report the latest measurements. Yet, the network may configure the user device for a set of cells (or beams) for reporting to trigger the update. Optionally, the user device may be configured to report measurements for a certain number of strongest cells and the update is triggered, if no one of the cells exceed the threshold. In another example, for each handover candidate cell, the user device may be configured to report only a certain number of highest reference signal (RS) indices above the threshold.

It is also possible to provide a configuration for not reporting: when a certain number of cells are above the threshold, no update is triggered.

As a default configuration, when no explicit configuration is received, the user device may be specified to trigger the update when all the resources are below the threshold.

In the examples above, the threshold may be an absolute threshold or a relative threshold compared to contention based random access (CBRA) resource(s): when CBRA resources are better (in quality) than the configured contention-free (CFRA) resources with a preconfigured offset value, an update is triggered. Another example of a relative threshold may be using the current serving cell in a comparison (with a preconfigured offset).

The current new radio or 5G quality measure may also be used: cell quality may be derived, for instance, by selecting the signal quality of the highest quality beam measurement to represent the cell quality. Beam measurements may be filtered using L1 or L3 filters (averaging of measurement in time domain) or as a combination of both. The user device may also take an average of a certain number of the highest quality beams above a threshold (absolute or relative) to derive the cell quality.

In the case no specific threshold is signaled, the user device may report RS index+RSRP/RSRQ/SINR/CSI (Channel State Information).

Additionally, in the initial procedure, the candidate handover target cell may reserve initial random access (CFRA) resources for the user device. As an option, candidate handover target cell may generate a recommendation for the random access update precondition. The candidate handover target cell may transmit a conditional handover request acknowledgment message to the serving access node, wherein the message comprises information on the reserved random access resources and/or the recommendation for the random access update precondition.

In block 204, carrying out measurements according to the configuration.

Communication between a user device and a radio access network may occur via narrow beams. Both cell and beam level measurements may be exploited in the conditional handover procedure. Measurements on the handover candidate cell(s) may be derived based on synchronization signal blocks (SSB) and/or channel state information reference signal (CSI-RS). Both cell and reference signal (RS) index ("beam") specific radio resource management (RRM) measurements (reference signal received power (RSRP), reference signal received quality (RSRQ) and signal-to-interference-plus-noise ratio (SINR)) can be derived based on these signals.

In blocks 206 and 208, transmitting, if the random access update precondition is fulfilled, a message to the serving access node, the message comprising information obtained by the measurements and indicating at least one beam of at least one handover candidate cell and/or at least one handover candidate cell that caused the random access update precondition being fulfilled for obtaining a random access resource configuration for carrying out the conditional handover.

The indicating at least one beam of at least one handover candidate cell and/or at least one handover candidate cell may be based on an RS index. Thus the measurements may be carried out RS index-based.

In an embodiment, the configuration further comprises at least one access precondition and a random access resource preconfiguration with regard to the at least one handover candidate cell, and if, based on to the measurements, the at least one access precondition is fulfilled, a contention-free random access is carried out to a cell for which the at least one access precondition is fulfilled based on the random access resource preconfiguration instead of transmitting the message to the serving access node.

In an embodiment, in response to the transmitted message, a message is received from the serving access node comprising an indication of a handover target cell and information on a random access resource configuration, and a contention-free random access is carried out to the indicated handover target cell using the informed random access resource configuration, wherein the random access is a contention-free random access. The message from the serving access node may also comprise a new random access update precondition for repeating the measurements and informing the measurement results to the serving access node. The message may comprise a new reporting configuration as an addition or as an option.

In an embodiment, a random access update release precondition for the least one handover candidate cell is received, and the carrying out measurements is stopped, if the random access update release precondition is fulfilled.

The embodiment ends in block 210. The embodiment is repeatable in many ways. Two examples are shown by arrows 212 and 214 in FIG. 2. It should be understood that the embodiment may be repeated one or more times with a constant or variable pause between separate rounds. The option shown by arrow 212 depicts the option when a new random access update precondition and a new configuration with regard to a conditional handover are received. This may take place after a random access to a handover target cell for a new conditional handover, when a handover attempt fails or when a serving access nodes finds a need for the new random access update precondition and for the new configuration, for instance when conditions in the network change. The new random access update precondition and the new configuration may also be informed in the same message with the random access resources. The option shown by arrow 214 may be repeated until the random access update precondition is fulfilled or until a random access update release precondition is fulfilled. Block 216 shows the option for carrying out a (contention-free) random access to a handover target cell, when at least one access precondition is fulfilled or when a message from the serving access node comprising an indication of a handover target cell and information on a random access resource configuration is received.

Another embodiment starts in block 300 of FIG. 3. This embodiment is suitable for being carried out by a node, server or host acting as a serving access node. It should be appreciated that the node, server or host may also be implemented as a distributed (computing) system comprising a centralized unit (CU) and distributed unit (DU), for example. The division of labour between units of the distributed system may vary according to needs and wishes of designers or system or service providers and it may be adapted to, for example, latency needs. It should also be appreciated that the node, server or host may comprise or be operationally coupled to radio parts, such as a (remote) radio head. Terms "receive" and "transmit" may comprise reception or transmission via a radio path. These terms may also mean preparation of a message to the radio path for an actual transmission or processing a message received from the radio path, for example, or controlling or causing a transmission or reception, when embodiments are implemented by software. The flexibility of NR with regard to a network architecture gives many options for implementation of the embodiments.

In block 302, a configuration and a random access update precondition are configured for a user device with regard to a conditional handover, wherein the configuration indicates at least one handover candidate cell.

It should be understood that the user device may have carried out measurements and transmitted a measurement report to the serving access node for the serving access node being able to carry out an initial preparation of a target cell with regard to a conditional handover (define at least one candidate cell). This initial procedure may be carried out, for instance, by a user device detecting that a configured "add cell" condition is satisfied, based on conducted serving and neighbor cell measurements. The user device sending a measurement report to a serving access node, wherein the message comprises at least RS index specific measurements for the strongest SSB or CSI-RS beams of the candidate cell, and possibly also a combination of RS index and cell specific measurements for the serving cell and the strongest neighbor cells according to the configuration. The serving access node sending a conditional handover request message to a candidate handover target cell, wherein the message comprises the RS index measurements for the candidate handover target cell.

The handover candidate cell selection for the configuration may also be, optionally or additionally, based on geography, cell size, user device's mobility, cell load, etc. as in a normal handover procedure.

The serving access node determines a random access update precondition (for example based on the initial procedure described above), it may also determine a separate reporting configuration, for example a period for reporting which may be proportional to the mobility of the user device and/or cell size. The update precondition may be given per a handover candidate cell or it may be a group-specific, for instance, applicable for cells in a certain geographical area. In case the update configuration is not present (or indicated by a single bit whether to update) the user device may assume that a previously stored default configuration is applicable. As another option for the reporting configuration is for defining the set of the cells the user device should include in a measurement report, for example: report measurements for a defined number of strongest candidate cells and/or beams or report measurements only for the strongest cell and/or beam (when no one of the handover candidate cells fulfil the random access update precondition). It is also possible to define that no reporting should be carried out for a certain period of time.

Measurements on the handover candidate cell(s) may be derived based on synchronization signal blocks (SSB) and/or channel state information reference signal (CSI-RS). An SSB (or synchronization sequences (SS) and physical broadcast channel (PBCH) block), may comprise a primary synchronization signal (PSS), secondary synchronization signal (SSS) and/or, PBCH (including PBCH demodulation reference signal (DMRS)). Both cell and reference signal (RS) index ("beam") specific radio resource management (RRM) measurements, such as reference signal received power (RSRP), reference signal received quality (RSRQ) and signal-to-interference-plus-noise ratio (SINR)) may be derived based on these signals.

The random access update precondition may comprise a threshold value to be used in evaluating whether the random access update precondition is fulfilled. The threshold value may be set based on the earlier measured values for the best cell or for a certain number of the best cells or based on the required rata rate or quality of service (for example, required reliability of the service), etc. In the case no specific threshold is signaled, the user device may report RS index+RSRP/RSRQ/SINR/CSI (Channel State Information).

In one example, the random access update precondition may comprise determining, when the average of a certain number of resources measured to have the best quality falls below the threshold. In another example, if only a certain number of resources (beams) exceeds the threshold, an update is triggered. In another option, a user device may have been configured with a number of resources and when only some of them are considered to be above the threshold, an update is triggered. An update may be triggered as well, when no resources are above the threshold. Alternatively, network may configure the user device to report periodically a certain number of resources measured as the best ones. Optionally, the user device may be configured to report the latest measurements. Yet, the network may configure the user device for a set of cells (or beams) for reporting to trigger the update. Optionally, the user device may be configured to report measurements for a certain number of strongest cells and the update is triggered, if no one of the cells exceed the threshold. In another example, for each handover candidate cell, the user device may be configured to report only a certain number of highest reference signal (RS) indices above the threshold.

It is also possible to provide a configuration for not reporting: when a certain number of cells are above the threshold, no update is triggered.

As a default configuration, when no explicit configuration is received, the user device may be specified to trigger the update when all the resources are below the threshold.

In the examples above, the threshold may be an absolute threshold or a relative threshold compared to contention based random access (CBRA) resource(s): when CBRA resources are better (in quality) than the configured contention-free (CFRA) resources with a preconfigured offset value, an update is triggered. Another example of a relative threshold may be using the current serving cell in a comparison (with a preconfigured offset).

The current new radio or 5G quality measure may also be used: cell quality may be derived, for instance, by selecting the signal quality of the highest quality beam measurement to represent the cell quality. Beam measurements may be filtered using L1 or L3 filters (averaging of measurement in time domain) or as a combination of both. The user device may also take an average of a certain number of the highest quality beams above a threshold (absolute or relative) to derive the cell quality.

Additionally, in the initial procedure, the candidate handover target cell may reserve initial random access (CFRA) resources for the user device. As an option, candidate handover target cell may generate a recommendation for the random access update precondition. The candidate handover target cell may transmit a conditional handover request acknowledgment message to the serving access node, wherein the message comprises information on the reserved random access resources and/or the recommendation for the random access update precondition.

The configuration may also comprise at least one access precondition and a random access resource preconfiguration with regard to the at least one handover candidate cell.

Additionally, the serving access node may configure a random access update release precondition for the least one handover candidate cell for the user device stop carrying out the measurements.

In block 304, the configuration and the random access update precondition are transmitted to the user device.

In block 306, a message from the user device is received, the message comprising information obtained by measurements carried out by the user device based on the configuration and indicating at least one beam of the at least one handover candidate cell and/or at least one handover candidate cell that caused the random access update precondition being fulfilled.

Communication between a user device and a radio access network may occur via narrow beams. Both cell and beam level measurements may be exploited in the conditional handover procedure. Measurements on the handover candidate cell(s) may be derived based on synchronization signal blocks (SSB) and/or channel state information reference signal (CSI-RS). Both cell and reference signal (RS) index ("beam") specific radio resource management (RRM) measurements (reference signal received power (RSRP), reference signal received quality (RSRQ) and signal-to-interference-plus-noise ratio (SINR)) can be derived based on these signals.

The indicating at least one beam of at least one handover candidate cell and/or at least one handover candidate cell may be based on an RS index. Thus the measurements may be carried out RS index-based.

In block 308, transmit a message to the at least one handover candidate cell wherein the random access update precondition is fulfilled for that cell being a handover target cell and reserving random access resources for the user device, wherein the message comprises the information obtained by the measurements carried out by the user device and, if indicated by the user device, indicating the at least one beam.

It should be appreciated that the indication may be based on the reference signal (RS) index.

In block 310, a message from the least one handover candidate cell being the handover target cell is received, the message indicating the reserved (contention-free) random access resources.

In block 312, a resource configuration is carried out based on the reserved random access resources and information on the resource configuration is transmitted, or the indication of the reserved random access resources is forwarded to the user device for carrying out the conditional handover.

If the serving access node adapts or (re)configures the resources, it determines a suitable random access configuration for the user device. The resources may be cell-specific or beam-specific.

The embodiment ends in block 314. The embodiment is repeatable in many ways. Two examples are shown by arrows 316 and 318 in FIG. 3. It should be understood that the embodiment may be repeated one or more times with a constant or variable pause between separate rounds. The option shown by arrow 316 depicts how information on measurements may be received from a user device one or more times for random access resourcing. For example, if the user device is configured to report measurement results periodically, the serving access node may decide not to trigger any action based on a report and wait for a following one. Another option is that the initially configured resources remain suitable and thus there is no need to make a reconfiguration, for example the user device does not move away from the coverage area of configured cells or beams. The option shown by arrow 318 depicts on option, where a new random access update precondition and a new configuration are prepared. This make take place, for example, after the user device has carried out the handover or if the handover attempt fails. The new random access update precondition and the new configuration may also be informed in the same message with the random access resources.

In the following, some examples of embodiments described above by means of FIGS. 2 and 3 are presented by means of signaling chart of FIG. 4. In FIG. 4, User device (UE) 402 may be UE 100 or 102 and serving access node 400 DU/CU 100 104/108, and handover candidate node (providing the handover target cell) 404 may be a similar DU/CU combination. The serving access node as well as the handover candidate node may also be DUs or located in CUs depending on the implementation. The following is an example only and it should not be taken as limiting to the embodiments.

In 406, UE 402 detects that the configured "add cell" condition is satisfied, based on conducted serving and neighbor cell measurements (this is as in handovers in general).

In 408, UE sends a measurement report (MR) to the serving gNB (access node) 400, containing at least the RS index specific measurements for the strongest SSB or CSI-RS beams of the candidate cell, and possibly also a combination of RS index and cell specific measurements for the serving cell and the strongest neighbor cells, if so configured. The measurements may be beam-specific and/or cell-specific.

In 410, the serving gNB sends a conditional handover request message to candidate gNB (handover candidate node) 404 comprising the RS index measurements of the candidate cell.

In 412, the candidate gNB reserves initial CFRA resources for the UE. As an option, candidate gNB could provide its recommendation of the CFRA update condition, or some other information, to aid the serving gNB to determine the CFRA update configuration.

In 414, the candidate gNB sends a conditional handover request acknowledgement message to the serving gNB, comprising information on the reserved initial CFRA resources, or the some assistance information.

In 416, the serving gNB determines a CFRA update configuration, comprising at least the CFRA update condition (a random access update precondition) and optionally also a reporting configuration. This update configuration may be given per a handover candidate. In the case the update configuration does not exist, the UE may assume a preconfigured default configuration is to be used. When the CFRA update condition is fulfilled, the UE sends a measurement report (MR) to the serving gNB comprising information needed in initiating the CFRA update procedure. In 418, the serving gNB sends a radio resource control (RRC) reconfiguration message comprising information on the initial CFRA resources and the CFRA update configuration to the UE.

In 420, the UE detects that the CFRA update condition is fulfilled based on measurements on SSB or CSI-RS mapped to CFRA resources of the configured candidate cells. The cause may be that the UE has moved away from the coverage area of the configured CFRA beam(s)/cell(s), for example.

In 422, the UE sends a measurement report to the serving gNB with the cause value "CFRA update". The MR contains RS index specific measurements for the best beams in candidate cell that triggered the CFRA update and/or for the handover candidate cell that caused the triggering.

In 424, the serving gNB sends a CFRA update request message to the candidate gNB comprising information on the RS index specific measurements.

In 426, the candidate gNB updates CFRA resources based on the provided RS index specific measurements.

In 428 the candidate gNB sends a CFRA update request acknowledgement message to the serving gNB comprising information on the updated CFRA resources.

In 430 the serving gNB determines a suitable CFRA configuration for the UE based on the information received from the candidate gNB. The serving gNB may adapt or (re)configure the CFRA resources or it may only forward information as received from the candidate gNB.

In 432, the serving gNB sends an RRC connection reconfiguration message to the UE comprising the new CFRA resources and, as an option, a new CFRA update condition.

In 434, the UE applies the new (up-to-date) CFRA resources when accessing the candidate gNB when carrying out a handover.

FIG. 5 illustrates a simplified block diagram of an apparatus according to an embodiment in relation to FIGS. 2 and/or 4.

An embodiment provides an apparatus which may be a user device or any other suitable apparatus capable to carry out processes described above in relation to FIGS. 2 and/or 4.

It should be appreciated that the apparatus may include or otherwise be in communication with a control unit, one or more processors or other entities capable of carrying out operations according to the embodiments described by means of FIGS. 2 and/or 4. It should be understood that each block of the flowchart of FIG. 2 and any combination thereof may be implemented by various means or their combinations, such as hardware, software, firmware, one or more processors and/or (electronic) circuitry. Terms "receive" and "transmit" may comprise reception or transmission via a radio path. These terms may also mean preparation of a message to the radio path for an actual transmission or processing a message received from the radio path, for example, or controlling or causing a transmission or reception, when embodiments are implemented by software.

As an example of an apparatus according to an embodiment, it is shown apparatus 500, such as a user device, including facilities in control unit or circuit/circuitry 504 (including one or more processors, for example) to carry out functions of embodiments according to FIGS. 2 and/or 4. The facilities may be software, hardware or combinations thereof as described in further detail below.

In FIG. 5, block 506 includes parts/units/modules needed for reception and transmission, usually called a radio front end, RF-parts, radio parts, remote radio head, etc. The parts/units/modules needed for reception and transmission may be comprised in the apparatus or they may be located outside the apparatus the apparatus being operationally coupled to them. The apparatus may also include or be coupled to one or more internal or external memory units.

Another example of apparatus 500 may include at least one processor 504 and at least one memory 502 including a computer program code, the at least one memory and the computer program code configured to, with the at least one processor, cause the apparatus at least to: receive, from a serving access node, a random access update precondition and a configuration with regard to a conditional handover, wherein the configuration indicates at least one handover candidate cell; carry out measurements according to the configuration, and if the random access update precondition is fulfilled, transmit a message to the serving access node, the message comprising information obtained by the measurements and indicating at least one beam of at least one handover candidate cell and/or at least one handover candidate cell that caused the random access update precondition being fulfilled for obtaining a random access resource configuration for carrying out the conditional handover.

It should be understood that the apparatus may include or be coupled to other units or modules etc., such as radio parts or radio heads, used in or for transmission and/or reception. This is depicted in FIG. 5 as optional block 506.

Yet another example of an apparatus comprises means (502, 504, 506) for receiving, from a serving access node, a random access update precondition and a configuration with regard to a conditional handover, wherein the configuration indicates at least one handover candidate cell; means (504, 506) for carrying out measurements according to the configuration, and means (502, 504, 506) for transmitting a message to the serving access node, the message comprising information obtained by the measurements and indicating at least one beam of at least one handover candidate cell and/or at least one handover candidate cell that caused the random access update precondition being fulfilled for obtaining a random access resource configuration for carrying out the conditional handover, if the random access update precondition is fulfilled.

It should be understood that the apparatus may include or be coupled to other units or modules etc., such as radio parts or radio heads, used in or for transmission and/or reception. This is depicted in FIG. 5 as optional block 506. The apparatus may also include or be coupled to a communications or user interface.

Although the apparatuses have been depicted as one entity in FIG. 5, different modules and memory may be implemented in one or more physical or logical entities.

FIG. 6 illustrates a simplified block diagram of an apparatus according to an embodiment in relation to FIGS. 3 and/or 4.

Another embodiment provides an apparatus which may be a node (network node, access node), server, host or any other suitable apparatus capable to carry out processes described above in relation to FIGS. 3 and/or 4. The apparatus is suitable for operating as a serving access node.

It should be appreciated that the apparatus may include or otherwise be in communication with a control unit, one or more processors or other entities capable of carrying out operations according to the embodiments described by means of FIGS. 3 and/or 4. It should be understood that each block of the flowchart of FIG. 3 and any combination thereof may be implemented by various means or their combinations, such as hardware, software, firmware, one or more processors and/or circuitry. Terms "receive" and "transmit" may comprise reception or transmission via a radio path. These terms may also mean preparation of a message to the radio path for an actual transmission or processing a message received from the radio path, for example, or controlling or causing a transmission or reception, when embodiments are implemented by software.

As an example of an apparatus according to an embodiment, it is shown apparatus 600, such as a node, server, host a distributed system, including facilities in control unit or circuit/circuitry 604 (including one or more processors, for example) to carry out functions of embodiments according to FIGS. 3 and/or 4. The facilities may be software, hardware or combinations thereof as described in further detail below.

In FIG. 6, block 606 includes parts/units/modules needed for reception and transmission, usually called a radio front end, RF-parts, radio parts, remote radio head, etc. The parts/units/modules needed for reception and transmission may be comprised in the apparatus or they may be located outside the apparatus the apparatus being operationally coupled to them. It should be understood that in the case of a distributed system, all the apparatuses forming the system may have radio parts of their own and communicate with one another by using their own radio parts.

The apparatus may also include or be coupled to one or more internal or external memory units.

Another example of apparatus 600 may include at least one processor 604 and at least one memory 602 including a computer program code, the at least one memory and the computer program code configured to, with the at least one processor, cause the apparatus at least to: prepare a configuration and a random access update precondition for a user device with regard to a conditional handover, wherein the configuration indicates at least one handover candidate cell; transmit the configuration and the random access update precondition to the user device; receive a message from the user device, the message comprising information obtained by measurements carried out by the user device based on the configuration and indicating at least one beam of the at least one handover candidate cell and/or at least one handover candidate cell that caused the random access update precondition being fulfilled; transmit a message to the at least one handover candidate cell that caused the random access update precondition being fulfilled for that cell being a handover target cell and reserving random access resources for the user device, wherein the message comprises the information obtained by the measurements carried out by the user device and, if indicated by the user device, indicating the at least one beam; receive a message from the least one handover candidate cell being the handover target cell, the message indicating the reserved random access resources, and carry out a resource configuration based on the reserved random access resources and transmit information on the resource configuration, or forward the indication of the reserved random access resources to the user device for carrying out the conditional handover.

It should be understood that the apparatus may include or be coupled to other units or modules etc., such as radio parts or radio heads, used in or for transmission and/or reception. This is depicted in FIG. 6 as optional block 606.

Yet another example of an apparatus comprises means (602, 604) for preparing a configuration and a random access update precondition for a user device with regard to a conditional handover, wherein the configuration indicates at least one handover candidate cell; means (602, 604, 606) for transmitting the configuration and the random access update precondition to the user device; means (602, 604, 606) for receiving a message from the user device, the message comprising information obtained by measurements carried out by the user device based on the configuration and indicating at least one beam of the at least one handover candidate cell and/or at least one handover candidate cell that caused the random access update precondition being fulfilled; means (602, 604, 606) for transmitting a message to the at least one handover candidate cell that caused the random access update precondition being fulfilled for that cell being a handover target cell and reserving random access resources for the user device, wherein the message comprises the information obtained by the measurements carried out by the user device and, if indicated by the user device, indicating the at least one beam; means (602, 604, 606) for receiving a message from the least one handover candidate cell being the handover target cell, the message indicating the reserved random access resources, and means (602, 604, 606) for carrying out a resource configuration based on the reserved random access resources and transmit information on the resource configuration, or forwarding the indication of the reserved random access resources to the user device for carrying out the conditional handover.

It should be understood that the apparatus may include or be coupled to other units or modules etc., such as radio parts or radio heads, used in or for transmission and/or reception. This is depicted in FIG. 6 as optional block 606.

Although the apparatuses have been depicted as one entity in FIG. 6, different modules and memory may be implemented in one or more physical or logical entities.

An apparatus may in general include at least one processor, controller, unit, module or (electronic) circuitry designed for carrying out functions of embodiments described above operationally coupled to at least one memory unit (or service) and to typically various interfaces. A circuitry may refer to hardware-only circuit implementations, such as implementations in only analog and/or digital circuitry, combinations of circuits and software (and/or firmware), such as different kind of processors of portions of them, software and/or circuit components, such as a microprocessor(s) or a portion of a microprocessor(s). Further, the memory units may include volatile and/or non-volatile memory. The memory unit may store computer program code and/or operating systems, information, data, content or the like for the processor to perform operations according to embodiments described above in relation to FIGS. 2, 3 and/or 4. Each of the memory units may be a random access memory, hard drive, etc. The memory units may be at least partly removable and/or detachably operationally coupled to the apparatus. The memory may be of any type suitable for the current technical environment and it may be implemented using any suitable data storage technology, such as semiconductor-based technology, flash memory, magnetic and/or optical memory devices. The memory may be fixed or removable.

The apparatus may be an electronic circuit or a system of electronic circuits performing a particular function in an electronic device with a computer program code. The electronic circuit may comprise at least one processor and additionally at least one internal or external memory. It should be understood that the term circuit/circuitry or electronic circuit may refer to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of circuit/circuitry applies to all uses of this term in this application.

The apparatus may be, include or be associated with at least one software application, module, unit or entity configured as arithmetic operation, or as a program (including an added or updated software routine), executed by at least one operation processor. Programs, also called program products or computer programs, including software routines, applets and macros, may be stored in any apparatus-readable data storage medium and they include program instructions to perform particular tasks. The data storage medium may be a non-transitory medium. The computer program or computer program product may also be downloaded to the apparatus. A computer program product may comprise one or more computer-executable components which, when the program is run, for example by one or more processors possibly also utilizing an internal or external memory, are configured to carry out any of the embodiments or combinations thereof described above by means of FIGS. 2, 3 and/or 4. The one or more computer-executable components may be at least one software code or portions thereof. Computer programs may be coded by a programming language or a low-level programming language.

Modifications and configurations required for implementing functionality of an embodiment may be performed as routines, which may be implemented as added or updated software routines, application circuits (ASIC) and/or programmable circuits. Further, software routines may be downloaded into an apparatus. The apparatus, such as a node device, or a corresponding component, may be configured as a computer or a microprocessor, such as single-chip computer element, or as a chipset, including at least a memory for providing storage capacity used for arithmetic operation and an operation processor for executing the arithmetic operation.

Embodiments provide computer programs embodied on a distribution medium, comprising program instructions which, when loaded into electronic apparatuses, constitute the apparatuses as explained above. The distribution medium may be a non-transitory medium.

Embodiments provide computer programs comprising instructions which, when the program is executed by an apparatus, cause the apparatus to carry out embodiments described by means of FIG. 2 or 3 (and/or 4).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

The techniques described herein may be implemented by various means. For example, these techniques may be implemented in hardware (one or more devices), firmware (one or more devices), software (one or more modules), or combinations thereof. For a hardware implementation, the apparatus may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, digitally enhanced circuits, other electronic units designed to perform the functions described herein, or a combination thereof. For firmware or software, the implementation may be carried out through modules of at least one chip set (e.g., procedures, functions, and so on) that perform the functions described herein. The software codes may be stored in a memory unit and executed by processors. The memory unit may be implemented within the processor or externally to the processor. In the latter case it may be communicatively coupled to the processor via various means, as is known in the art. Additionally, the components of systems described herein may be rearranged and/or complimented by additional components in order to facilitate achieving the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The invention and its embodiments are not limited to the examples described above but may vary within the scope of the claims.

The invention claimed is:

1. An apparatus comprising:
   at least one processor and at least one memory including a computer program code, the at least one memory and the computer program code configured to, with the at least one processor, cause the apparatus at least to:
   receive, from a serving access node, a random access update precondition and a configuration with regard to a conditional handover, wherein the configuration indicates at least one handover candidate cell;
   carry out measurements according to the configuration, and
   based on the random access update precondition being fulfilled, transmit a message to the serving access node, the message comprising information obtained by the measurements and indicating at least one of the following:
   at least one beam of at least one handover candidate cell; or
   at least one handover candidate cell that caused the random access update precondition being fulfilled for obtaining a random access resource configuration for carrying out the conditional handover.

2. The apparatus of claim 1, wherein the configuration further comprises at least one access precondition and a random access resource preconfiguration with regard to the at least one handover candidate cell, further comprising causing the apparatus to:
   if, based on the measurements, the at least one access precondition is fulfilled,
   carry out a random access to a cell for which the at least one access precondition is fulfilled based on the random access resource preconfiguration instead of transmitting the message, wherein the random access is a contention-free random access.

3. The apparatus of claim 1, further comprising causing the apparatus to:
   receive, in response to the transmitted message, a message from the serving access node comprising an indication of a handover target cell and information on a random access resource configuration, and
   carry out a random access to the indicated handover target cell using the informed random access resource configuration, wherein the random access is a contention-free random access.

4. The apparatus of claim 1, further comprising causing the apparatus to:
   receive a random access update release precondition for the least one handover candidate cell, and
   stop carrying out the measurements if the random access update release precondition is fulfilled.

5. An apparatus comprising:
   at least one processor and at least one memory including a computer program code, the at least one memory and the computer program code configured to, with the at least one processor, cause the apparatus at least to:
   prepare a configuration and a random access update precondition for a user device with regard to a conditional handover, wherein the configuration indicates at least one handover candidate cell;
   transmit the configuration and the random access update precondition to the user device;
   receive a message from the user device, the message comprising information obtained by measurements carried out by the user device based on the configuration and indicating at least one of the following:
   at least one beam of the at least one handover candidate cell; or
   at least one handover candidate cell that caused the random access update precondition being fulfilled;
   transmit a message to the at least one handover candidate cell that caused the random access update precondition being fulfilled for that cell being a handover target cell and reserving random access resources for the user device, wherein the message comprises the information obtained by the measurements carried out by the user device and, if indicated by the user device, indicating the at least one beam;
   receive a message from the least one handover candidate cell being the handover target cell, the message indicating the reserved random access resources, and
   carry out a resource configuration based on the reserved random access resources and transmit information on the resource configuration, or forward the indication of the reserved random access resources to the user device for carrying out the conditional handover.

6. The apparatus of claim 5, wherein the configuration further comprises at least one access precondition and a random access resource preconfiguration with regard to the at least one handover candidate cell.

7. The apparatus of claim 5, wherein the configuration further comprises a random access update release precondition for the least one handover candidate cell for the user device to stop carrying out the measurements, if the random access update release precondition is fulfilled.

8. The apparatus of claim 5, further comprising causing the apparatus to:
   prior to the preparing the configuration and the transmitting the configuration and the random access update precondition to the user device,
   prepare the conditional handover with the user device and the indicated at least one handover candidate cell.

9. A method comprising:
receiving, from a serving access node, a random access update precondition and a configuration with regard to a conditional handover, wherein the configuration indicates at least one handover candidate cell;
carrying out measurements according to the configuration, and
based on the random access update precondition being fulfilled, transmitting a message to the serving access node, the message comprising information obtained by the measurements and indicating at least one of the following:
 at least one beam of at least one handover candidate cell; or
 at least one handover candidate cell that caused the random access update precondition being fulfilled for obtaining a random access resource configuration for carrying out the conditional handover.

10. The method of claim 9, wherein the configuration further comprises at least one access precondition and a random access resource preconfiguration with regard to the at least one handover candidate cell, the method further comprising:
if, based on the measurements, the at least one access precondition is fulfilled,
carrying out a random access to a cell for which the at least one access precondition is fulfilled based on the random access resource preconfiguration instead of transmitting the message, wherein the random access is a contention-free random access.

11. The method of claim 9, further comprising:
receiving, in response to the transmitted message, a message from the serving access node comprising an indication of a handover target cell and information on a random access resource configuration, and
carrying out a random access to the indicated handover target cell using the informed random access resource configuration, wherein the random access is a contention-free random access.

12. The method of claim 9, further comprising:
receiving a random access update release precondition for the least one handover candidate cell, and
stopping carrying out the measurements if the random access update release precondition is fulfilled.

13. A method comprising:
preparing a configuration and a random access update precondition for a user device with regard to a conditional handover, wherein the configuration indicates at least one handover candidate cell;
transmitting the configuration and the random access update precondition to the user device;
receiving a message from the user device, the message comprising information obtained by measurements carried out by the user device based on the configuration and indicating at least one of the following:
 at least one beam of the at least one handover candidate cell; or
 at least one handover candidate cell that caused the random access update precondition being fulfilled;
transmitting a message to the at least one handover candidate cell that caused the random access update precondition being fulfilled for that cell being a handover target cell and reserving random access resources for the user device, wherein the message comprises the information obtained by the measurements carried out by the user device and, if indicated by the user device, indicating the at least one beam;
receiving a message from the least one handover candidate cell being the handover target cell, the message indicating the reserved random access resources, and
carrying out a resource configuration based on the reserved random access resources and transmit information on the resource configuration, or forwarding the indication of the reserved random access resources to the user device for carrying out the conditional handover.

14. The method of claim 13, wherein the configuration further comprises at least one access precondition and a random access resource preconfiguration with regard to the at least one handover candidate cell.

15. The method of claim 13, wherein the configuration further comprises a random access update release precondition for the least one handover candidate cell for the user device to stop carrying out the measurements, if the random access update release precondition is fulfilled.

16. The method of claim 13, further comprising:
prior to the preparing the configuration and the transmitting the configuration and the random access update precondition to the user device,
preparing the conditional handover with the user device and the indicated at least one handover candidate cell.

17. The apparatus of claim 1, wherein the message indicates at least one beam of at least one handover candidate cell.

18. The apparatus of claim 1, wherein the message indicates at least one handover candidate cell that caused the random access update precondition being fulfilled for obtaining the random access resource configuration for carrying out the conditional handover.

* * * * *